June 10, 1952   E. A. KLIEWER, SR   2,600,115
VALVE
Filed May 15, 1946   2 SHEETS—SHEET 1
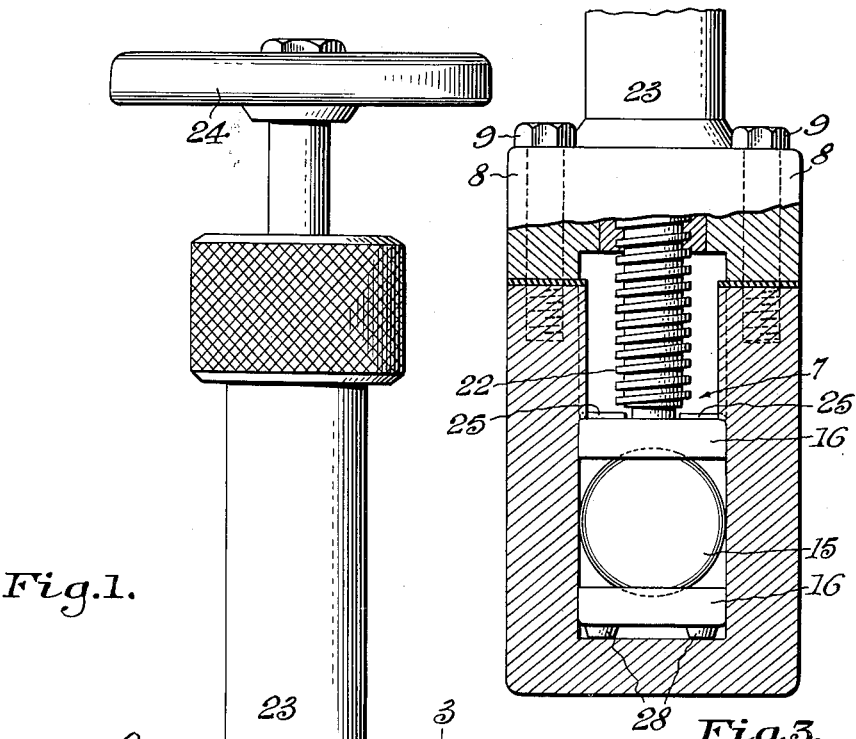
Fig.1.
Fig.3.
Inventor
Edward A. Kliewer, Sr.
By Mason, Porter, Diller & Stewart
Attorneys
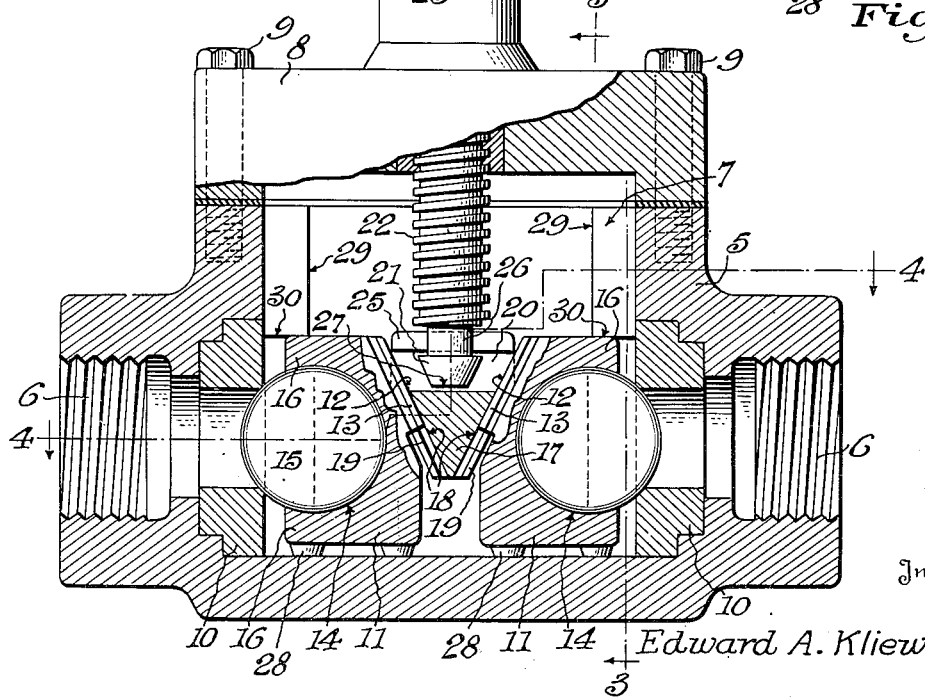

June 10, 1952  E. A. KLIEWER, SR  2,600,115
VALVE

Filed May 15, 1946  2 SHEETS—SHEET 2

Inventor
Edward A. Kliewer, Sr.
By Mason, Porter, Diller & Stewart
Attorneys

Patented June 10, 1952

2,600,115

UNITED STATES PATENT OFFICE 2,600,115

VALVE

Edward Albert Kliewer, Sr., Longview, Tex.

Application May 15, 1946, Serial No. 669,738

4 Claims. (Cl. 251—70)

The invention relates generally to valves and primarily seeks to provide a novel form of valve structure subject to being manufactured inexpensively, and which is positive and efficient in operation in controlling the flow of various liquids, including highly volatile liquids, at high pressures.

An object of the invention is to provide a valve structure including a seat and a valve element including a wholly or partly spherical surface movable into and out of engagement with the seat, and means mounting said element so that it is free to turn about the center of said spherical surface.

Another object of the invention is to provide a valve structure including a casing having a valve chamber and axially aligned ports opening into and from said chamber, a seat associated with each port, a valve element for controlling each seat, a follower carrying each valve element, and means for simultaneously moving the followers apart or together to force the valve elements against the seats or withdraw them from the seats to close or open the valve.

Another object of the invention is to provide a valve structure of the character stated in which the means for moving the followers comprises an actuater member equipped with wedge faces having dovetail slide connection with the followers.

Another object of the invention is to provide a valve structure of the character stated in which means is provided for first moving the followers apart along a line passing through the aligned ports, and then transversely to clear a free passage between the seats.

Another object of the invention is to provide a valve structure of the character stated in which the seats are removably mounted and the chamber is closed by a bonnet which is removable to provide an opening through which said seats, the followers and valve elements and the actuater member can be withdrawn.

With the above and other objects in view that will hereinafter appear, the nature of the invention will be more clearly understood by reference to the following detailed description, the appended claims, and the several views illustrated in the accompanying drawing.

In the drawings:

Figure 1 is a side elevation and part vertical longitudinal section illustrating a valve structure embodying the invention.

Figure 3 is a vertical cross section taken on the line 3—3 of Figure 1.

Figure 2:
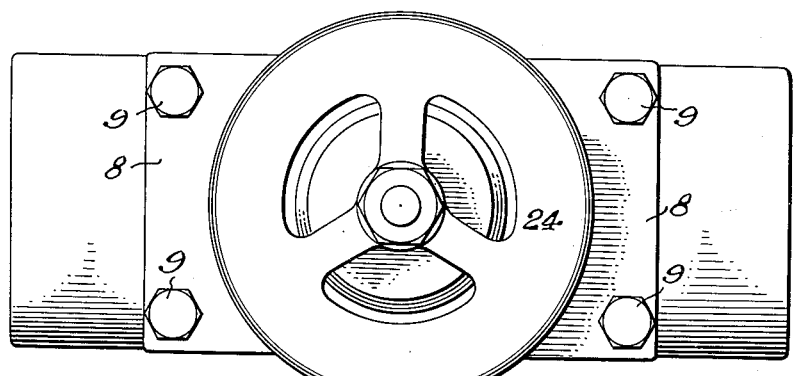
Figure 2 is a plan view.

In the example of embodiment of the invention herein disclosed, the improved valve structure includes a casing 5 having two axially aligned ports 6 leading into and from a valve chamber 7. It will be apparent by reference to Figures 1 and 3 of the drawings that the valve chamber extends a considerable distance above the level of the ports, and said chamber is closed at the top by a bonnet 8 which is removably secured on the casing by screws 9. Ring seats 10 are press fitted or otherwise removably secured in suitable recesses provided therefor in the casing, one thereof being axially aligned with each of the ports 6.

Two follower members 11 are mounted in the valve chamber 7, and each comprises a generally rectangular block having an angularly disposed inner wall 12. The angularly disposed walls are arranged in opposed relation, and each thereof is equipped with a dovetail portion or overhanging ledge 13 for a purpose soon to be described. Each follower also is provided with a ball socket 14 in which is rotatably mounted a ball valve member 15. It will be apparent by reference to Figures 1 and 3 that the balls are retained in their mounting sockets by overhanging shoulders 16.

A wedge actuator 17 is mounted in the valve chamber 7 for cooperation with the followers 11, and said actuator is provided with wedge faces 18 which are dovetailed as at 19 for cooperation with the previously mentioned dovetail portions 13 of the followers. The actuator 17 has a center clearance 20 in which to receive the cone head 21 carried at the lower end of the actuator member 22 which in the form of the invention illustrated herein constitutes a screw. The screw actuator 22 is threaded through the bonnet sleeve 23 and has a handle 24 attached to the upper end thereof.

It will be apparent by reference to Figures 1 and 3 of the drawings that the overhanging shoulders 25 on the wedge actuator 17 are disposed to extend over and be engaged by the top shoulder 26 of the cone head 21, and the lower, flat end 27 of said cone head is engageable with the bottom of the clearance 20 in said cone head. Thus, by rotation of the screw 22, the wedge actuator 17 will be lifted or lowered, and, by reason of the dovetail connections 13, 19 with the followers 11 will serve to impart movement to said followers in a manner and for a purpose to be described hereinafter.

Each follower 11 is provided with a plurality of depending projections 28 which serve to space the followers above the bottom of the valve chamber when they are positioned in the manner illustrated in Figures 1 and 3, thereby to prevent fouling by any bits of debris which may collect in the bottom of said chamber.

Figure 4:
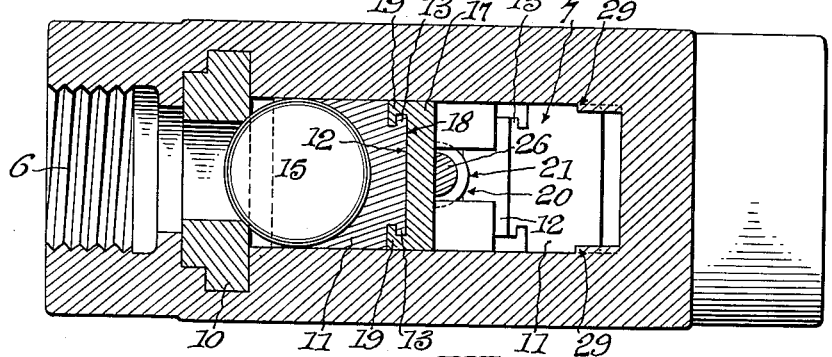
Figure 4 is a horizontal section taken on the line 4—4 on Figure 1.

It will be apparent by reference to Figures 1, 3 and 4 of the drawings that the casing is provided with four guide shoulders 29 disposed in the corners thereof, and said shoulders include horizontally disposed guide surfaces 30 at the lower end extremities thereof. The inner edge portions of the guide shoulders 29 serve to guide vertical movement of the followers 11, and the bottom surfaces 30 of said shoulders serve to guide horizontal movement of said followers toward and from the seats 10.

In Figure 1 of the drawings, a closed condition of the valve is illustrated, both balls 15 being tightly pressed against the respective seats 10. It will be obvious that the balls may be securely held in the seat engaging position by turning the screw 22 in the clockwise direction, thereby causing the wedge actuator 17 to engage between the surfaces 12 of the followers and spread them apart. When it is desired to open the valve, the screw 22 is rotated in a counterclock direction so as to draw the wedge follower 17 upwardly. Upward movement of the wedge member 17 will first cause the followers to move together in the horizontal direction, guided by the shoulder surfaces 30, and after the followers have been moved together so as to displace the balls 15 from their seats, the continued upward movement of the wedge member 17 will draw the followers 11 and the balls upwardly, guided by the vertical shoulder surfaces. The clearance provided in the chamber 7 is sufficient to permit withdrawal of the followers to an elevation at which the bottom surfaces thereof will clear the flow passages in the seats 10. It will be obvious that by reversing the direction of rotation of the screw 22, the followers will be lowered into contact with the bottom surface of the valve chamber, and then will be forced apart, or moved horizontally, to cause the balls 15 to tightly engage the seats 10.

Figure 5:
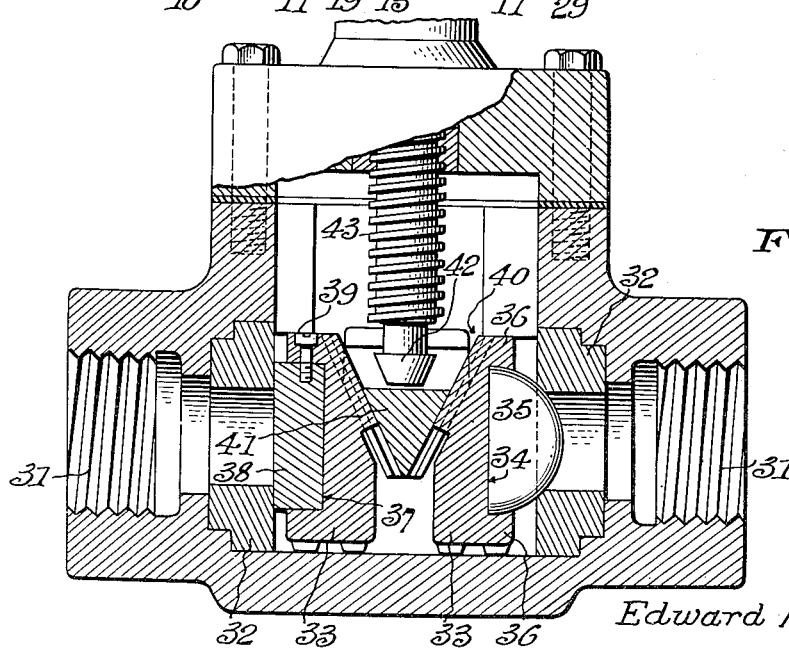
Figure 5 is a fragmentary vertical longitudinal section showing a valve structure having incorporated therein a modified form and arrangement of valve elements.

In Figure 5 of the drawings there is illustrated a modified form of the invention in which the ports 31 and seats 32 and the remainder of the general structure of the valve may be the same as previously described. In this form of the invention, the followers 33 are slightly modified in construction. One said follower, preferably the one disposed at the low pressure side of the valve, is provided with a seat or clearance 34 in which to receive a half ball valve element 35, and as in the case of the previously described form of the invention, said follower includes overhanging shoulders 36 for retaining the valve member in position. In this modified mounting of the valve element, the half ball member is free to rotate about the center of the part spherical surface thereof in a single plane only, and not universally as in the case of the ball valve members of Figures 1 to 4.

The other follower 33 is provided with a recess 37 in which to removably receive a flat disk valve element 38, said disk being removably secured in the recess in any approved manner, as by the screw 39 shown in Figure 5. The exposed flat face of the disk 38 is engageable with the seat 32 at the high pressure side of the valve.

Both followers 33 have dovetail connection at 40 with an actuater wedge 41 which is coupled as at 42 with the actuater member 43.

It will be apparent that by manipulation of the actuater member 43 the followers 33 can be moved apart or together and lifted and lowered in the same manner as has been previously described herein for presenting the valve elements 35 and 38 to the seats or for removing them from the seat engaging positions.

The particular formation and arrangement of valve elements illustrated in Figure 5 makes it possible to provide a valve structure which is shorter in its over-all length than the valve structure illustrated in Figure 1.

While one form of the invention has been shown for purposes of illustration, it is to be clearly understood that various changes in the details of construction and arrangement of parts may be made without departing from the spirit and scope of the invention as defined in the appended claims.

I claim:

1. In a valve structure, a casing having a valve chamber therein and two ports disposed in axial alignment and opening into and from said chamber, a seat associated with each port, two followers movably mounted in said chamber and each carrying a valve element engageable with one of the seats, a wedge actuater having dovetail connection with the followers, and means for moving the actuater in one direction to force the followers apart and the valve elements against the seats and in the opposite direction to move the followers toward each other to move said valve elements away from said seats, one said valve element comprising a half ball rotatably mounted on one follower, and the other said element comprising a flat faced disk secured on the other follower.

2. In a valve structure, a casing having a generally rectangular valve chamber therein having flat parallel side walls and two ports disposed in axial alignment and opening into and from said chamber, a seat associated with each port, two followers movably mounted in said chamber including flat parallel sides engaging in slide guiding contact with said side walls, each said follower having a part spherical mounting recess opposing the respective seat and opening through upright face portions paralleling and opposing said respective seat, a ball valve element freely rotatable in each recess and projecting therefrom for cooperation with the opposed seat, each said ball being free to rotate in all directions about its center in its respective recess, a wedge actuater having dovetail connection with the followers, said followers also having wide top and bottom surfaces paralleling the common axis of the seats and inner opposing parallel face portions, said casing having upright parallel spaced guide ledges facing inwardly at each side away from the respective seats and horizontal overhanging guide ledges the latter cooperating with the chamber bottom in providing horizontal guides for movement of the followers, an actuater screw having a horizontal free rotating connection with the wedge actuater and disposed with its axis traversing the common axis of the seats, and means threadably mounting said screw whereby upon rotation thereof in one direction the wedge actuater will be lifted and the followers moved together in the horizontal guides confined beneath said guide ledges to withdraw the balls from the seats and bring the inner opposing face portions into contact and then be lifted in the upright guides to lift the followers above the flow passage through the seats said followers being guided in said lifting movement by said upright parallel guide ledges, and upon rotation in the other direction to force the wedge actuater downwardly to again lower the followers onto the chamber bottom and then force them apart to press the balls firmly against the seats.

3. In a valve structure, a casing having a valve chamber therein and two ports disposed in axial alignment and opening into and from said chamber, a seat associated with each port, two ball valve elements, means supporting each said valve element in a manner permitting free rotation thereof in all directions about its center and in position for being engageable with the opposed seat, right angled guide means confining said supporting means for straight line movement along the axis of the ports a limited distance sufficient to free the balls from the seats and then perpendicularly with relation to said axis, and means including a single screw and a connection between said screw and said supporting means effective upon turning of the screw in one direction to first move the supporting means in the confining guide means to clear the balls from the seats and then move said supporting means and balls perpendicularly with relation to said axis and away from said seats, and effective when turned in the opposite direction to first return the supporting means straight downwardly into ball and seat axis aligning position and then horizontally to move said supporting means along said axis for placing the balls against said seats.

4. In a valve structure, a casing having a valve chamber therein and two ports disposed in axial alignment and opening into and from said chamber, a seat associated with each port, two valve elements at least one thereof presenting an in part spherical portion for contact with one of said seats, means supporting each said valve element opposite the opposed seat and in a manner for permitting free rotation of the element having the in part spherical portion, right angled guide means confining said supporting means for straight line movement along the axis of the ports a limited distance sufficient to free the valve elements from the seats and then perpendicularly with relation to said axis, and means including a single screw and a connection between said screw and said supporting means effective upon turning of the screw in one direction to first move the supporting means in the confining guide means to clear the valve elements from the seats and then move said supporting means and valve elements perpendicularly with relation to said axis and away from said seats, and effective when turned in the opposite direction to first return the supporting means straight downwardly into valve element and seat axis aligning position and then horizontally to move said supporting means along said axis for placing the valve elements against said seats.

EDWARD ALBERT KLIEWER, Sr.

REFERENCES CITED

The following references are of record in the file of this patent:

UNITED STATES PATENTS

| Number | Name | Date |
|---|---|---|
| 414,509 | Fisher | Nov. 5, 1889 |
| 712,682 | Jefferson | Nov. 4, 1902 |
| 791,173 | Anglim | May 30, 1905 |
| 834,878 | Anderson | Nov. 6, 1906 |
| 904,056 | Farrell | Nov. 17, 1908 |
| 1,314,609 | Sault | Sept. 2, 1919 |
| 2,028,177 | Williams | Jan. 21, 1936 |
| 2,076,336 | Fahey | Apr. 6, 1937 |
| 2,100,996 | Moore | Nov. 30, 1937 |
| 2,282,553 | Banowetz | May 12, 1942 |

FOREIGN PATENTS

| Number | Country | Date |
|---|---|---|
| 8,985 | Great Britain | Apr. 29, 1899 |
| 8,084 | Great Britain | 1909 |